(12) United States Patent
Bozzano et al.

(10) Patent No.: US 11,655,424 B2
(45) Date of Patent: May 23, 2023

(54) PROCESS FOR PRODUCING JET FUEL FROM A BIORENEWABLE FEED

(71) Applicant: UOP LLC, Des Plaines, IL (US)

(72) Inventors: Andrea G. Bozzano, Northbrook, IL (US); Haiyan Wang, Hoffman Estates, IL (US); Krishna Mani, Gurgaon (IN); Stanley Joseph Frey, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 17/497,284

(22) Filed: Oct. 8, 2021

(65) Prior Publication Data

US 2022/0127537 A1    Apr. 28, 2022

(30) Foreign Application Priority Data

Oct. 24, 2020   (IN) .............................. 202011046430

(51) Int. Cl.
| | |
|---|---|
| *C10G 69/04* | (2006.01) |
| *C10G 3/00* | (2006.01) |
| *C10G 45/58* | (2006.01) |
| *C10G 7/00* | (2006.01) |

(52) U.S. Cl.
CPC .............. *C10G 69/04* (2013.01); *C10G 3/42* (2013.01); *C10G 3/50* (2013.01); *C10G 7/00* (2013.01); *C10G 45/58* (2013.01); *C10G 2300/1011* (2013.01); *C10G 2300/4081* (2013.01); *C10G 2400/04* (2013.01); *C10G 2400/08* (2013.01)

(58) Field of Classification Search
CPC .... C10G 2300/1011; C10G 2300/4081; C10G 2400/04; C10G 2400/08; C10G 3/42; C10G 3/50; C10G 45/58; C10G 69/04; C10G 7/00; Y02E 50/10; Y02P 30/20

See application file for complete search history.

(56) References Cited

U.S. PATENT DOCUMENTS

| | | | |
|---|---|---|---|
| 3,268,436 A | 8/1966 | Arey, Jr. et al. | |
| 8,314,274 B2* | 11/2012 | Marker ..................... | C10L 1/06 44/605 |
| 2004/0230085 A1 | 11/2004 | Jakkula et al. | |
| 2020/0277531 A1 | 9/2020 | Wexler et al. | |

OTHER PUBLICATIONS

PCT International Search Report and Written Opinion for PCT/S2021/071969 dated Jan. 13, 2022.

* cited by examiner

*Primary Examiner* — Ellen M McAvoy
*Assistant Examiner* — Chantel L Graham
(74) *Attorney, Agent, or Firm* — Paschall & Associates, LLC; James C. Paschall

(57) ABSTRACT

The process produces a diesel stream from a biorenewable feedstock by hydrotreating to remove heteroatoms and hydroisomerization to improve cold flow properties. Heavy diesel can be hydrocracked to jet fuel range material or further hydroisomerized to increase its value lower its freeze point while light diesel may be taken as a motor fuel.

20 Claims, 4 Drawing Sheets

PROCESS FOR PRODUCING JET FUEL FROM A BIORENEWABLE FEED

CROSS-REFERENCE TO RELATED APPLICATIONS

This application claims priority from Indian Provisional Application No. 202011046430, filed Oct. 24, 2020, which is incorporated herein in its entirety.

FIELD

The field is producing hydrocarbons useful as aviation fuel from biorenewable feedstock such as triglycerides and free fatty acids found in materials such as plant and animal fats and oils.

BACKGROUND

As the demand for fuel increases worldwide, there is increasing interest in producing fuels and blending components from sources other than crude oil. Often referred to as a biorenewable source, these sources include, but are not limited to, plant oils such as corn, rapeseed, canola, soybean, microbial oils such as algal oils, animal fats such as inedible tallow, fish oils and various waste streams such as yellow and brown greases and sewage sludge. A common feature of these sources is that they are composed of glycerides and free fatty acids (FFA). Both triglycerides and the FFAs contain aliphatic carbon chains having from about 8 to about 24 carbon atoms. The aliphatic carbon chains in triglycerides or FFAs can be fully saturated, or mono, di or poly-unsaturated.

Hydroprocessing can include processes which convert hydrocarbons in the presence of hydroprocessing catalyst and hydrogen to more valuable products. Hydrotreating is a process in which hydrogen is contacted with hydrocarbons in the presence of hydrotreating catalysts which are primarily active for the removal of heteroatoms, such as sulfur, nitrogen, oxygen and metals from the hydrocarbon feedstock. In hydrotreating, hydrocarbons with double and triple bonds such as olefins may be saturated.

The production of hydrocarbon products in the diesel boiling range can be achieved by hydrotreating a biorenewable feedstock. A biorenewable feedstock can be hydroprocessed by hydrotreating to deoxygenate, including decarboxylate and decarbonylate, the oxygenated hydrocarbons. Hydrotreating may be followed by hydroisomerization to improve cold flow properties of product diesel and jet fuel. Hydroisomerization or hydrodewaxing is a hydroprocessing process that increases the alkyl branching on a hydrocarbon backbone in the presence of hydrogen and hydroisomerization catalyst to improve cold flow properties of the hydrocarbon. Hydroisomerization includes hydrodewaxing herein.

Hydrocracking is a hydroprocessing process in which hydrocarbons crack in the presence of hydrogen and hydrocracking catalyst to lower molecular weight hydrocarbons. Depending on the desired output, a hydrocracking unit may contain one or more beds of the same or different catalyst.

As refiners seek to add capability for processing biorenewable feedstocks, processes are sought to produce greater volumes of jet fuel due to its high value and demand. Processes for producing diesel and increased yield of jet fuel from biorenewable feedstocks are desired.

SUMMARY OF THE INVENTION

The process produces a diesel stream from a biorenewable feedstock by hydrotreating it to remove heteroatoms and hydroisomerization to improve cold flow properties. Heavy diesel can be hydrocracked to jet fuel range material to increase its value while light diesel may be taken as a motor fuel.

DEFINITIONS

Figure 1:
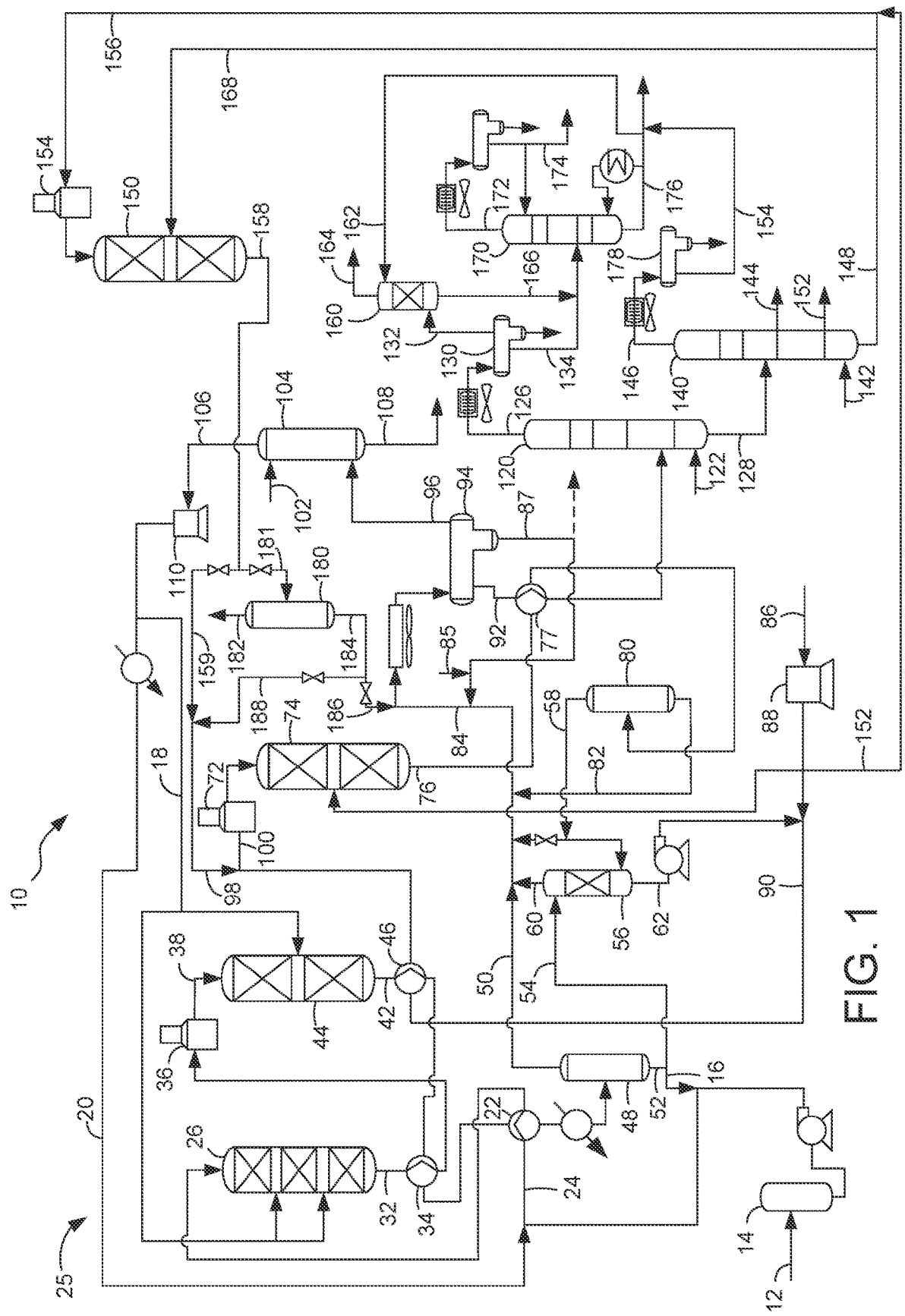
FIG. 1 is a simplified process flow diagram of the present disclosure.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without passing through a fractionation or conversion unit to undergo a compositional change due to physical fractionation or chemical conversion.

The term "indirect communication" means that flow from the upstream component enters the downstream component after passing through a fractionation or conversion unit to undergo a compositional change due to physical fractionation or chemical conversion.

The term "bypass" means that the object is out of downstream communication with a bypassing subject at least to the extent of bypassing.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripper columns may omit a reboiler at a bottom of the column and instead provide heating requirements and separation impetus from a fluidized inert media such as steam. Stripping columns typically feed a top tray and take main product from the bottom.

As used herein, the term "a component-rich stream" means that the rich stream coming out of a vessel has a greater concentration of the component than the feed to the vessel.

As used herein, the term "a component-lean stream" means that the lean stream coming out of a vessel has a smaller concentration of the component than the feed to the vessel.

As used herein, the term "boiling point temperature" means atmospheric equivalent boiling point (AEBP) as calculated from the observed boiling temperature and the distillation pressure, as calculated using the equations furnished in ASTM D86 or ASTM D2887.

As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio.

As used herein, the term "T5" or "T95" means the temperature at which 5 mass percent or 95 mass percent, as the case may be, respectively, of the sample boils using ASTM D-86 or TBP.

As used herein, the term "initial boiling point" (IBP) means the temperature at which the sample begins to boil using ASTM D2887, ASTM D-86 or TBP, as the case may be.

As used herein, the term "end point" (EP) means the temperature at which the sample has all boiled off using ASTM D2887, ASTM D-86 or TBP, as the case may be.

As used herein, the term "diesel boiling range" means hydrocarbons boiling in the range of an IBP between about 125° C. (257° F.) and about 175° C. (347° F.) or a T5 between about 150° C. (302° F.) and about 200° C. (392° F.) and the "diesel cut point" comprising a T95 between about 343° C. (650° F.) and about 399° C. (750° F.) using the TBP distillation method.

As used herein, the term "diesel conversion" means conversion of feed that boils above the diesel cut point to material that boils at or below the diesel cut point in the diesel boiling range.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "predominant" or "predominate" means greater than 50%, suitably greater than 75% and preferably greater than 90%.

As used herein, the term "$C_x$" are to be understood to refer to molecules having the number of carbon atoms represented by the subscript "x". Similarly, the term "$C_x-$" refers to molecules that contain less than or equal to x and preferably x and less carbon atoms. The term "$C_x+$" refers to molecules with more than or equal to x and preferably x and more carbon atoms.

As used herein, the term "carbon number" refers to the number of carbon atoms per hydrocarbon molecule and typically a paraffin molecule.

DETAILED DESCRIPTION

With growing emphasis on environmental and sustainable economy, it has become more and more attractive for refiners to produce green fuels as part of their portfolio to maximize their profitability from Renewable Identification Numbers (RINs) credited under the Renewable Fuel Standard Program. RINs are credits used for compliance which can be traded within the program to increase profitability. The present disclosure enables refiners to maximize jet fuel yield produced from biorenewable sources and provides flexibility to optimize yields of jet fuel product relative to diesel fuel product in response to market demand.

In FIG. 1, in accordance with an exemplary embodiment, a process 10 is shown for processing a biorenewable feedstock. A feed line 12 transports a feed stream of fresh biorenewable feedstock into a feed surge drum 14. The biorenewable feedstock may be blended with a mineral feed stream but preferably comprises a predominance of biorenewable feedstock. A mineral feedstock is a conventional feed derived from crude oil that is extracted from the ground. The biorenewable feedstock may comprise a nitrogen concentration of about 50 wppm to about 800 wppm. The biorenewable feedstock may comprise high oxygen content which can be up to 10 wt % or higher. The biorenewable feedstock may also comprise about 1 to about 500 wppm sulfur, typically no more than about 200 wppm sulfur.

A variety of different biorenewable feedstocks may be suitable for the process 10. The term "biorenewable feedstock" is meant to include feedstocks other than those obtained from crude oil. The biorenewable feedstock may include any of those feedstocks which comprise at least one of glycerides and free fatty acids. Most of glycerides will be triglycerides, but monoglycerides and diglycerides may be present and processed as well. Free fatty acids may be obtained from phospholipids which may source phosphorous in the feedstock. Examples of these biorenewable feedstocks include, but are not limited to, camelina oil, canola oil, corn oil, soy oil, rapeseed oil, soybean oil, colza oil, tall oil, sunflower oil, hempseed oil, olive oil, linseed oil, coconut oil, castor oil, peanut oil, palm oil, mustard oil, tallow, yellow and brown greases, lard, train oil, fats in milk, fish oil, algal oil, sewage sludge, and the like. Additional examples of biorenewable feedstocks include non-edible vegetable oils from the group comprising *Jatropha curcas* (Ratanjot, Wild Castor, Jangli Erandi), *Madhuca indica* (Mohuwa), *Pongamia pinnata* (Karanji, Honge), *calophyllum inophyllum, moringa oleifera* and *Azadirachta indica* (Neem). The triglycerides and FFAs of the typical vegetable or animal fat contain aliphatic hydrocarbon chains in their structure which have about 8 to about 30 carbon atoms. As will be appreciated, the biorenewable feedstock may comprise a mixture of one or more of the foregoing examples. The biorenewable feedstock may be pretreated to remove contaminants and filtered to remove solids.

The biorenewable feed stream in feed line 12 flows from the feed surge drum 14 via a charge pump and mixes with a hot recycle stream in a recycle line 16 and a recycle hydrotreating hydrogen stream in a hydrotreating hydrogen line 20 to provide a combined biorenewable feed stream. The recycle to feed rate can be about 2:1 to about 5:1. The combined biorenewable feed stream 12 may be heated in a combined feed exchanger 22 by heat exchange with a hydrotreated stream in a hydrotreated line 42. The heated combined biorenewable feed stream in a combined feed line 24 may be then charged to a hydrotreating reactor section 25.

The hydrotreating reactor section 25 may include a guard bed reactor 26. The guard bed temperature may range between about 246° C. (475° F.) and about 343° C. (650° F.) and suitably between about 288° C. (550° F.) and about 304° C. (580° F.). Reaction temperature is operated low enough to prevent olefins in the FFA from polymerizing but high enough to foster olefin saturation, hydrodemetallation, hydrodeoxygenation, including hydrodecarbonylation and hydrodecarboxylation, hydrodesulfurization and hydrodenitrification reactions to occur.

The guard bed can comprise a base metal on a support. Base metals useable in this process include non-noble metals, nickel, chromium, molybdenum and tungsten. Other base metals that can be used include tin, indium, germanium, lead, cobalt, gallium and zinc. The process can also use a metal sulfide, wherein the metal in the metal sulfide is selected from one or more of the base metals listed. The biorenewable feedstock can be charged through the base metal catalysts at pressures from 1379 kPa (abs) (200 psia) to 6895 kPa (abs) (1000 psia). In a further embodiment, the guard bed catalyst can comprise a second metal, wherein the second metal includes one or more of the metals: tin, indium, ruthenium, rhodium, rhenium, osmium, iridium, germanium, lead, cobalt, gallium, zinc and thallium. A nickel molybdenum on alumina catalyst may be a suitable catalyst in the guard bed reactor 26. Multiple guard beds may be contained in the guard bed reactor 26 such as 2, 3 or more and a hydrogen quench from a hydrogen quench line 18 may be injected at interbed locations to control temperature exotherms.

A contacted biorenewable feed stream is discharged from the guard bed reactor 26 in contacted feed line 32. In the guard bed reactor 26, most of the hydrodemetallation and hydrodeoxygenation, including hydrodecarbonylation and hydrodecarboxylation, reactions will occur with some hydrodenitrogenation and hydrodesulfurization occurring. Metals removed will include alkali metals and alkali earth metals and phosphorous.

The contacted biorenewable feed stream may be heated in a guard bed discharge heat exchanger 34 by heat exchange with a hydrotreated stream in the hydrotreated line 42 to increase the temperature of the contacted biorenewable feed stream. Moreover, the contacted biorenewable feed stream may be further heated in a charge heater 36 which may be a fired heater to increase the temperature of the contacted biorenewable feed stream. The hydrotreating reactor section 25 may also include a hydrotreating reactor 44. The heated, contacted biorenewable feed stream is charged to a hydrotreating reactor 44 of the hydrotreating reactor section 25.

In the hydrotreating reactor 44, the heated, contacted biorenewable feed stream is contacted with a hydrotreating catalyst in the presence of hydrogen at hydrotreating conditions to saturate the olefinic or unsaturated portions of the n-paraffinic chains in the biorenewable feedstock. The hydrotreating catalyst also catalyzes hydrodeoxygenation reactions, including hydrodecarboxylation and hydrodecarbonylation reactions, to remove oxygenate functional groups from the hydrocarbon molecules in the biorenewable feedstock which are converted to water and carbon oxides. The hydrotreating catalyst also catalyzes hydrodesulfurization of organic sulfur and hydrodenitrogenation of organic nitrogen in the biorenewable feedstock. Essentially, the hydrotreating reaction removes heteroatoms from the hydrocarbons and saturates olefins in the feed stream.

The hydrotreating catalyst may be provided in one, two or more beds and employ interbed hydrogen quench streams from the hydrogen quench stream from a hydrogen quench line 18. Two hydrotreating catalyst beds are shown in FIG. 1, but one or more are contemplated.

The hydrotreating catalyst may comprise nickel, nickel/molybdenum, or cobalt/molybdenum dispersed on a high surface area support such as alumina. Other catalysts include one or more noble metals dispersed on a high surface area support. Non-limiting examples of noble metals include platinum and/or palladium dispersed on an alumina support such as gamma-alumina. Suitable hydrotreating catalysts include BDO 200 or BDO 300 available from UOP LLC in Des Plaines, Ill. The hydrotreating reaction temperature may range from between about 343° C. (650° F.) and about 427° C. (800° F.) and preferably between about 349° C. (690° F.) and about 400° C. (752° F.). Generally, hydrotreating conditions include a pressure of about 700 kPa (100 psig) to about 21 MPa (3000 psig).

A hydrotreated stream is produced in a hydrotreated line 42 from the hydrotreating reactor 44 of the hydrotreating reactor section 25 comprising a hydrocarbon fraction which has a substantial n-paraffin concentration. Oxygenate concentration in the hydrocarbon fraction is essentially nil, whereas the olefin concentration is substantially reduced relative to the contacted biorenewable feed stream. The organic sulfur concentration in the hydrocarbon fraction is no more than 500 wppm and the organic nitrogen concentration in the hydrocarbon fraction is less than 10 wppm.

The hydrotreated stream in the hydrotreated line 42 may first flow to the combined isomerization feed exchanger 46 to heat the hydoisomerization feed stream in the hydroisomerization feed line 90 and cool the hydrotreated stream. As previously described, the cooled hydrotreated stream in the hydrotreated line 42 may then be heat exchanged with the contacted biorenewable feed stream in the guard bed discharge heat exchanger 34 to cool the hydrotreated stream in the hydrotreated line 42 and heat the contacted, biorenewable feed stream in contacted line 32. The twice cooled hydrotreated steam in the hydrotreated line 42 may be then further cooled in the combined feed exchanger 22 by heat exchange with combined biorenewable feed stream in the combined feed line 24 to heat the combined biorenewable feed stream and cool the hydrotreated stream in the hydrotreated line 42. The thrice cooled hydrotreated stream may be even further cooled, perhaps to make steam, before it is separated to provide a hydrotreated vapor stream and a hydrotreated liquid stream having a smaller oxygen concentration than the biorenewable feed stream.

The hydrotreated stream may be separated in a hot separator 48 to provide a hydrocarbonaceous, hot vapor stream in a hot separator overhead line 50 and a hydrocarbonaceous, hot liquid stream in a hot separator bottoms line 52. The hot separator 48 may be in downstream communication with the hydrotreating reactor 44. The hot separator 48 operates at about 177° C. (350° F.) to about 371° C. (700° F.) and preferably operates at about 232° C. (450° F.) to about 315° C. (600° F.). The hot separator 34 may be operated at a slightly lower pressure than the hydrotreating reactor 44 accounting for pressure drop through intervening equipment. The hot separator 48 may be operated at pressures between about 3.4 MPa (gauge) (493 psig) and about 20.4 MPa (gauge) (2959 psig). The hot vapor stream in the hot separator overhead line 50 may have a temperature of the operating temperature of the hot separator 48.

The hot liquid stream in the hot separator bottoms line 52 may be split into two streams: a hot process liquid stream in a process line 54 taken from the hot liquid stream in the hot separator bottoms line 52 and the hot recycle liquid stream in the recycle line 16 also taken from the hot liquid stream in the hot separator bottoms line 52. The hot recycle liquid stream in the recycle line 16 may be combined with the biorenewable feed stream in line 12 as previously described.

The hot process liquid stream taken from the hot liquid stream in the process line 54 may be further separated in a hydrotreating separator 56 which may comprise an enhanced hot separator (EHS) with the aid of a stripping gas fed from an isomerization overhead line 58. The hot process liquid stream is separated to provide a hydrotreated vapor stream and a hydrotreated liquid stream. The hydrotreating separator 56 may be a high-pressure stripping column. In the hydrotreating separator 56, the hot process liquid stream from process line 54 flows down through the column where it is partially stripped of hydrogen, carbon dioxide, carbon monoxide, water vapor, propane, hydrogen sulfide, and phosphine, which are potential isomerization catalyst poisons, by contact with stripping gas from the isomerization overhead line 58. The stripping gas may comprise makeup hydrogen gas which has passed through the isomerization reactor 74 and an isomerization separator 80 as hereinafter described.

The stripping gas in the isomerization overhead line 58 enters the hydrotreating separator 56 below the inlet for the hot process liquid stream in the process liquid line 54. The hydrotreating separator 56 may include internals such as trays or packing located between the inlet for the hot process liquid stream in the process liquid line 54 and the inlet for the stripping gas in the isomerization overhead line 58 to facilitate stripping of the hot process liquid stream in the process line 54. The stripping gas including stripped gases exit in a hydrotreated vapor stream in a hydrotreated overhead line 60 extending from a top of the hydrotreating separator 56 and mix with the hot vapor stream in the hot overhead line 50 and an isomerization liquid stream in an isomerization bottoms line 82 and optionally a cold aqueous stream in a cold aqueous line 87 from a cold separator boot and a hydrocracked liquid stream in line 186 to provide a cold separator feed stream in a cold feed line 84.

The hydrotreated liquid stream which may have been stripped collects in the bottom of the hydrotreating separator 56 and flows in a hydrotreated bottoms line 62 to the suction side of a bottoms pump. The hydrotreated liquid stream comprises diesel range material, with a high paraffinic concentration due to the composition of the biorenewable feedstock.

While a desired product, such as a transportation fuel, may be provided in the hydrotreated bottoms line 62 because the hot liquid stream comprises a higher concentration of normal paraffins, it will possess poor cold flow properties. Accordingly, to improve the cold flow properties, the hydrotreated liquid stream may be contacted with a hydroisomerization catalyst in a hydroisomerization reactor 74 under hydroisomerization conditions to hydroisomerize the normal paraffins to branched paraffins.

The hydrotreated liquid stream may be hydroisomerized over hydroisomerization catalyst in the presence of a hydroisomerization hydrogen stream. Make-up hydrogen gas in make-up line 86 may be compressed in a make-up gas compressor 88 and mixed with the hydrotreated liquid stream pumped from the hydrotreated bottoms line 62 to provide a hydroisomerization feed stream in a hydroisomerization feed line 90. The hydroisomerization feed stream in the hydroisomerization feed line 90 may be heated in an isomerization feed exchanger 46 by heat exchange with the hydrotreated stream in the hydrotreated line 42. The heated hydroisomerization feed stream may be optionally mixed with a whole hydrocracked stream or a liquid hydrocracked stream in a recycle line 98 to provide a combined hydroisomerization feed stream in a combined hydroisomerization feed line 100. The combined hydroisomerization feed stream may be heated in a hydroisomerization charge heater 72 to bring the combined hydroisomerization feed stream to hydroisomerization temperature before charging the combined hydroisomerization feed stream to the hydroisomerization reactor 74.

Hydroisomerization, including hydrodewaxing, of the normal hydrocarbons in the hydroisomerization reactor 74 can be accomplished over one or more beds of hydroisomerization catalyst, and the hydroisomerization may be operated in a co-current mode of operation. Fixed bed, trickle bed down-flow or fixed bed liquid filled up-flow modes are both suitable. A make-up hydrogen quench stream taken from the make-up line 86 may be provided for interbed quench to the hydroisomerization reactor 74.

Suitable hydroisomerization catalysts may comprise a metal of Group VIII (IUPAC 8-10) of the Periodic Table and a support material. Suitable Group VIII metals include platinum and palladium, each of which may be used alone or in combination. If the hydroisomerization catalyst is located in the hydrotreating reactor such as in FIG. 3, non-noble metals should be used which are not as susceptible to sulfur deactivation in a sour environment. Examples of suitable non-noble metals include Ni, Mo, Co, W, Mn, Cu, Zn or Ru. Mixtures of hydrogenation metals may also be used such as Co/Mo, Ni/Mo and Ni/W. The amount of hydrogenation metal or metals may range from 0.1 to 5 wt. %, based on the catalyst weight. Methods of loading metal onto the support material include, for example, impregnation of the support material with a metal salt of the hydrogenation component and heating. The catalyst support material containing the hydrogenation metal may also be sulfided prior to use.

The support material may be amorphous or crystalline. Suitable support materials include amorphous alumina, amorphous silica-alumina, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48, ZSM-50, ZSM-57, MeAPO-11, MeAPO-31, MeAPO-41, MgAPSO-11, MgAPSO-31, MgAPSO-41, MgAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. Nos. 4,943,424; 5,087,347; 5,158,665; and 5,208,005. MgAPSO is a MeAPSO, which is an acronym for a metal aluminumsilicophosphate molecular sieve, where the metal, Me, is magnesium (Mg). Suitable MgAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form, as taught in U.S. Pat. Nos. 4,795,623 and 4,924,027. Further catalysts and conditions for skeletal isomerization are disclosed in U.S. Pat. Nos. 5,510,306, 5,082,956, and 5,741,759. The hydroisomerization catalyst may also comprise a modifier selected from the group consisting of lanthanum, cerium, praseodymium, neodymium, samarium, gadolinium, terbium, and mixtures thereof, as described in U.S. Pat. Nos. 5,716,897 and 5,851,949. Other suitable support materials include ZSM-22, ZSM-23, and ZSM-35, which are described for use in dewaxing in U.S. Pat. No. 5,246,566 and in the article entitled S. J. Miller, "New Molecular Sieve Process for Lube Dewaxing by Wax Isomerization," 2 Microporous Materials 439-449 (1994). U.S. Pat. Nos. 5,444,032 and 5,608,968 teach a suitable bifunctional catalyst which is constituted by an amorphous silica-alumina gel and one or more metals belonging to Group VIIIA and is effective in the hydroisomerization of long-chain normal paraffins containing more than 15 carbon atoms. U.S. Pat. Nos. 5,981,419 and 5,908,134 teach a suitable bifunctional catalyst which comprises: (a) a porous crystalline material isostructural with beta-zeolite selected from boro-silicate (BOR—B) and boro-alumino-silicate (Al—BOR—B) in which the molar $SiO_2:Al_2O_3$ ratio is higher than 300:1; (b) one or more metal(s) belonging to Group VIIIA, selected from platinum and palladium, in an amount comprised within the range of from 0.05 to 5% by weight. V. Calemma et al., App. Catal. A: Gen., 190 (2000), 207 teaches yet another suitable catalyst. Alumina or silica may be added to the support material.

DI-100 available from UOP LLC in Des Plaines, Ill. may be a suitable hydroisomerization catalyst.

Hydroisomerization conditions generally include a temperature of about 150° C. (302° F.) to about 450° C. (842° F.) and a pressure of about 1724 kPa (abs) (250 psia) to about 13.8 MPa (abs) (2000 psia). In another embodiment, the hydroisomerization conditions include a temperature of about 300° C. (572° F.) to about 360° C. (680° F.) and a pressure of about 3102 kPa (abs) (450 psia) to about 6895 kPa (abs) (1000 psia).

A hydroisomerized stream in a hydroisomerized line 76 from the isomerization reactor 74 is a branched-paraffin-rich stream. By the term "rich" it is meant that the effluent stream has a greater concentration of branched paraffins than the stream entering the isomerization reactor 74, and preferably comprises greater than 50 mass-% branched paraffins of the total paraffin content. It is envisioned that the hydroisomerized effluent may contain 80, 90 or 95 mass-% branched paraffins of the total paraffin content. Hydroisomerization conditions in the hydroisomerization reactor 74 are selected to avoid undesirable cracking, so the predominant product in the hydroisomerized stream in the hydroisomerized line 76 is a branched paraffin. By avoiding undesirable cracking, the hydroisomerized stream in the hydroisomerized line 76 will have the same composition with regard to carbon numbers as the combined hydroisomerization feed stream in line 100. For example, although the combined hydroisomerization feed stream may have 8 wt % paraffins with four carbon atoms, the hydroisomerized stream will also have 8 wt % paraffins with four carbon atoms although the hydroisomerized stream will have a greater proportion of paraffins that are isobutanes than the hydroisomerization feed stream and the hydroisomerization feed stream will have a greater proportion of paraffins that are normal butanes than the hydroisomerized stream. This principle will apply typically to paraffins of all carbon numbers passing through the hydroisomerization reactor 74, but particularly applicable to paraffins with carbon numbers of three to seventeen. The optimal amount of remaining normal paraffins in line 76 is dependent on the selectivity of the hydroisomerization catalysts but might typically be between 1-7 wt-%.

The hydroisomerized stream in the hydroisomerized line 76 from the isomerization reactor 74 flows to an isomerate exchanger 77 to be heat exchanged with a cold liquid stream in cold bottoms line 92 to cool it before entering the hydroisomerization separator 80 for separation into a liquid hydroisomerized stream and vapor hydroisomerized stream. The vapor hydroisomerized stream in a hydroisomerized overhead line 58 extending from an overhead of hydroisomerization separator 80 flows to the hydrotreating separator 56 and may serve as the stripping gas in the hydrotreating separator 56. A portion of the vapor hydroisomerized stream may optionally bypass the hydrotreating separator 56 and enter a cold feed line 84 through a control valve.

The liquid hydroisomerized stream in the hydroisomerization bottoms line 82 extending from a bottom of the hydroisomerization separator 80 may be sent directly to a distillation column 140 for producing product streams without condensing and cooling. However, the liquid hydroisomerized stream from the hydroisomerization separator 80 in the hydroisomerization bottoms line 82 may be further separated in a cold separator 94 along with the hot vapor stream in the hot overhead line 50, the hydrotreated vapor stream in the hydrotreated overhead line 60, the cold aqueous stream in the cold aqueous line 87 from the boot of the cold separator 94 and the liquid hydrocracked stream in the hydrocracking separator bottoms line 186 all combined in a cold separator stream in the cold separator feed line 84. The cold aqueous stream in the cold aqueous line 87 supplemented by water from line 85 is added to the cold separator feed line 84 to dissolve salts that may be present in the hydrocarbon phases. The cold separator stream in the cold separator feed line 84 is cooled and fed to the cold separator 94.

In the cold separator 94, vaporous components in the hydroisomerized liquid stream will separate and ascend with the hydrotreated vapor stream from hydrotreated overhead line 60 and the hot vapor stream in the hot overhead line 50 to provide a cold vapor stream in a cold overhead line 96. The cold vapor stream in the cold overhead line 96 may be passed through a trayed or packed recycle scrubbing column 104 where it is scrubbed by means of a scrubbing liquid such as an aqueous solution fed by scrubbing liquid line 102 to remove acid gases including hydrogen sulfide and carbon dioxide by extracting them into the aqueous solution. Preferred scrubbing liquids include Selexol™ available from UOP LLC in Des Plaines, Ill. and amines such as alkanolamines including diethanol amine (DEA), monoethanol amine (MEA), methyl diethanol amine (MDEA), diisopropanol amine (DIPA), and diglycol amine (DGA). Other scrubbing liquids can be used in place of or in addition to the preferred amines. The lean scrubbing liquid contacts the cold vapor stream and absorbs acid gas contaminants such as hydrogen sulfide and carbon dioxide. The resultant "sweetened" cold vapor stream is taken out from an overhead outlet of the recycle scrubber column 104 in a recycle scrubber overhead line 106, and a rich scrubbing liquid is taken out from the bottoms at a bottom outlet of the recycle scrubber column 104 in a recycle scrubber bottoms line 108. The spent scrubbing liquid from the bottoms may be regenerated and recycled back to the recycle scrubbing column 104 in the scrubbing liquid line 102.

The scrubbed hydrogen-rich stream emerges from the scrubber via the recycle scrubber overhead line 106 and may be compressed in a recycle compressor 110. The compressed hydrogen stream in the scrubber overhead line 106 supplies hydrogen to the hydrotreating hydrogen stream in the hydrotreating hydrogen line 20, the interbed quench streams through the quench line 18 for the guard bed reactor 26 and the hydrotreating reactor 44 and the hydrocracking hydrogen stream in line 152 for the hydrocracking reactor.

The recycle scrubbing column 104 may be operated with a gas inlet temperature between about 38° C. (100° F.) and about 66° C. (150° F.) and an overhead pressure of about 3 MPa (gauge) (435 psig) to about 20 MPa (gauge) (2900 psig). Suitably, the recycle scrubbing column 104 may be operated at a temperature of about 40° C. (104° F.) to about 125° C. (257° F.) and a pressure of about 1200 to about 1600 kPa. The temperature of the hot vapor stream to the recycle scrubbing column 104 may be between about 20° C. (68° F.) and about 80° C. (176° F.) and the temperature of the scrubbing liquid stream in the scrubbing liquid line 102 may be between about 20° C. (68° F.) and about 70° C. (158° F.).

Liquid components from the liquid hydrocracked stream in line 186 gravitate into the cold liquid stream in the cold bottoms line 92. The cold liquid stream in cold bottoms line 92 comprises hydrocarbons useful as diesel boiling range fuel as well as other hydrocarbons such as propane, naphtha and jet fuel. Accordingly, they may be fractionated in a distillation column 140. The cold aqueous stream may be collected from a boot of the cold separator in the cold aqueous line 87.

In an embodiment, the cold liquid stream may first be stripped in a stripping column 120 to remove hydrogen sulfide and other gases. The cold liquid stream in the cold bottoms line 92 may be heated by heat exchange in the isomerate exchanger 77 with a hydroisomerized stream in the hydroisomerized line 76 to heat the cold liquid stream and fed to the stripping column 120 from an inlet which may be in a bottom half of the column. A stripping media which is an inert gas such as steam from a stripping media line 122 may be used to strip light gases from the cold bottoms line 92. The stripping column 120 provides an overhead stripping stream of naphtha, LPG, hydrogen, hydrogen sulfide, steam and other gases in a stripper overhead line 126 and a stripped liquid isomerized stream in a stripped bottoms line 128. The overhead stripping stream may be condensed and separated in a stripping receiver 130. A net stripper overhead line 132 from the receiver 130 may carry a net stripper gaseous stream to a sponge absorber 160 for LPG recovery. Unstabilized liquid naphtha from the bottoms of the receiver 130 in a liquid overhead stream may be transported in a stripper receiver bottoms line 134 to a debutanizer column 170 for naphtha and LPG recovery. A sour water stream may be collected from a boot of the overhead receiver 130.

The stripping column 120 may be operated with a bottoms temperature between about 149° C. (300° F.) and about 288° C. (550° F.), preferably no more than about 260° C. (500° F.), and an overhead pressure of about 0.35 MPa (gauge) (50 psig), preferably no less than about 0.70 MPa (gauge) (100 psig), to no more than about 2.0 MPa (gauge) (290 psig). The temperature in the overhead receiver 130 ranges from about 38° C. (100° F.) to about 66° C. (150° F.) and the pressure is essentially the same as in the overhead of the stripping column 120.

The stripped liquid hydroisomerization stream in the stripper bottoms line 128 may be fed to the distillation column 140. The distillation column 140 may be reboiled by heat exchange with a suitable hot stream or in a fired heater to provide the necessary heat for the distillation. Alternately, a stripping media which is an inert gas such as steam from a stripping media line 142 may be used to heat the column. The distillation column 140 provides an overhead gaseous stream of naphtha and steam in an overhead line 146 and a distillation bottoms liquid stream in a distillation bottoms line 148. The distillation overhead stream may be fully condensed and separated from water in a distillation receiver 178. Unstabilized liquid naphtha from the bottom of the receiver 178 in a distillation overhead liquid line 154 may combined with a naphtha stream in line 176. A sour water stream may be collected from a boot of the distillation receiver 178.

Two product streams may be taken from the side of the distillation column 140. A first side stream taken above the first side stream may be taken in a first side line 144 comprising a jet fuel stream having a T5 of about 115° C. (239° F.) to about 130° C. (266° F.) and a T90 of about 240° C. (464° F.) to about 270° C. (518° F.). The jet fuel will meet the ASTM D7566 jet fuel specification. A second side stream in a second side line 152 may comprise a light diesel stream having a T5 of about 230° C. (446° F.) to about 250° C. (482° F.) and a T90 of about 279° C. (560° F.) to about 296° C. (590° F.). The distillation bottoms liquid stream in the distillation bottoms line 148 may be a heavy diesel stream having a T5 of about 279° C. (560° F.) to about 296° C. (590° F.) and a T90 of about 343° C. (650° F.) to about 399° C. (750° F.). Both of the side streams may be stripped in a side stripper that is not shown.

The normal paraffins will concentrate in the heavier hydrocarbon stream. Distilling the jet fuel in the first side stream and even light diesel in the second side stream, will heavily enrich the concentration of normal paraffins in the heavy diesel stream in the stripper bottoms line 148 leaving the jet fuel stream and the light diesel stream with an acceptable normal paraffin concentration that will enable the jet fuel stream to meet jet fuel specifications. The heavy diesel stream in the distillation bottoms line 148 with an increased concentration normal paraffins can then be subjected to additional hydroisomerization by recycle or hydrocracking in a hydrocracking reactor to further manage normal paraffin concentration. Enriching the normal paraffin concentration provides hydrocarbon molecules that are more easily hydrocracked in a hydrocracking reactor 150 and biases equilibrium in the hydroisomerization reactor 74 toward production of more isoparaffins. In an aspect, the normal paraffin concentration of the jet fuel stream in the first side line 144 may be no more than 1 mass-%, suitably less than 0.6 mass-% and preferably no more than 0.5 mass-% of the total paraffin content of the jet fuel stream in line 144. The preferred paraffin concentration may meet a freeze point of −40° C.

In an aspect, the concentration of normal paraffins of a given carbon number in the distillate bottoms line 148 should be at least double, but more suitably at least triple, of that in the hydroisomerized stream in the hydroisomerized line 76. This enrichment is required to promote more selective hydrocracking of the normal paraffins in the hydrocracking reactor 150 and/or promote selective hydroisomerization of the normal paraffins in the hydroisomerization reactor 74 thereby increasing jet fuel yield.

The distillation column 140 may be operated with a bottoms temperature between about 149° C. (300° F.) and about 288° C. (550° F.), preferably no more than about 260° C. (500° F.), and an overhead pressure of about 0.35 MPa (gauge) (50 psig), preferably no less than about 0.70 MPa (gauge) (100 psig), to no more than about 2.0 MPa (gauge) (290 psig). The temperature in the overhead receiver 178 ranges from about 38° C. (100° F.) to about 66° C. (150° F.) and the pressure is essentially the same as in the overhead of the distillation column 140. It is also envisioned that the distillation column 140 may just provide a net overhead stream comprising jet fuel in the distillation overhead liquid line 154, with naphtha and lighter stream taken in a receiver overhead line (not shown), and a diesel stream taken in the distillate bottoms line 148.

The sponge absorber column 160 may receive the net stripper gaseous stream in the net stripper overhead line 132. A lean absorbent stream in a lean absorbent line 162 may be fed into the sponge absorber column 160 through an absorbent inlet. The lean absorbent may comprise a naphtha stream in a lean absorbent line 162 perhaps from a debutanizer bottoms stream in line 176. In the sponge absorber column 160, the lean absorbent stream and the net stripper gaseous stream are counter-currently contacted. The sponge absorber absorbs LPG hydrocarbons from the net stripper gaseous stream into an absorbent rich stream.

The hydrocarbons absorbed by the sponge absorbent include some methane and ethane and most of the LPG, $C_3$ and $C_4$, hydrocarbons, and any $C_5$ and $C_6+$ light naphtha hydrocarbons in the net stripper gaseous stream. The sponge absorber column 160 operates at a temperature of about 34° C. (93° F.) to about 60° C. (140° F.) and a pressure essentially the same as or lower than the stripping receiver 130 less frictional losses. A sponge absorption off gas stream depleted of LPG hydrocarbons is withdrawn from a top of the sponge absorber column 160 at an overhead outlet through a sponge absorber overhead line 164. The sponge absorption off gas stream in the sponge absorber overhead line 164 may be transported to a hydrogen recovery unit that is not shown for hydrogen recovery. A rich absorbent stream rich in LPG hydrocarbons is withdrawn in a rich absorber bottoms line 166 from a bottom of the sponge absorber column 160 at a bottoms outlet which may be fed to a debutanizer column 170 via the stripper liquid overhead stream in the stripper receiver bottoms line 134.

In an embodiment, the debutanizer column 170 may fractionate the stripper liquid overhead stream and the rich absorbent stream in the stripper receiver bottoms line 134 into a debutanized bottoms stream comprising predominantly $C_5+$ hydrocarbons and a debutanizer overhead stream comprising LPG hydrocarbons. The debutanizer overhead stream in a debutanizer overhead line 172 may be fully condensed with reflux to the debutanizer column 170 and recovery of LPG in a debutanized overhead liquid stream in a net receiver bottoms line 174. The debutanized bottoms stream may be withdrawn from a bottom of the debutanizer column 170 in a debutanized bottoms line 176. A reboil stream taken from a bottom of the debutanizer column 170 or from a debutanized bottoms stream in the debutanizer bottoms line 176 may be boiled up in the reboil line and sent back to the debutanizer column 170 to provide heat to the column. Alternatively, a hot inert media stream such as steam may be fed to the column 170 to provide heat.

The distillation bottoms stream in the distillation bottoms line 148 may comprise heavy diesel boiling range hydrocarbons. Because the normal paraffins are concentrated in the bottom stream it is well suited for hydrocracking or further hydroisomerization. A refiner may desire to convert the heavy diesel to jet fuel to improve the product slate composition. Consequently, the heavy diesel stream in the distillation bottoms line 148 may be mixed with the hydrocracking hydrogen stream in line 152 taken from the compressed make-up hydrogen stream in line 86, heated in a heater 154 and fed in line 156 to a hydrocracking reactor 150.

The hydrocracking reactor 150 may be a fixed bed reactor that comprises one or more vessels, single or multiple catalyst beds in each vessel, and various combinations of hydrocracking catalyst in one or more vessels. The hydrocracking reactor 150 may be operated in a conventional continuous gas phase, a moving bed or a fluidized bed hydroprocessing reactor. A portion of the heavy diesel stream in line 160

The heavy diesel stream is hydroprocessed over a hydrocracking catalyst in the hydrocracking reactor in the presence of a hydrocracking hydrogen stream from a hydrocracking hydrogen line 152 to provide a hydrocracked stream. A portion of the diesel stream in line 168 may be used as an interbed quench to cool hydrocracked effluent between catalyst beds. In an alternative aspect, the supplemental hydrogen may be added between the catalyst beds.

The hydrocracking reactor may provide a total conversion of at least about 20 vol % and typically greater than about 60 vol % of the heavy diesel stream in the distilled bottoms line 148 to products boiling below the heavy diesel range of about 293° C. (560° F.) to about 310° C. (590° F.). The hydrocracking reactor 150 may operate at partial conversion of more than about 30 vol % or full conversion of at least about 90 vol % of the feed based on total conversion. The hydrocracking reactor 40 may be operated at mild hydrocracking conditions which will provide about 20 to about 60 vol %, preferably about 20 to about 50 vol %, total conversion of the hydrocarbon feed stream to product boiling below the heavy diesel boiling range.

The hydrocracking catalyst may utilize amorphous silica-alumina bases or zeolite bases combined with one or more Group VIII or Group VIB metal hydrogenating components to selectively produce a balance of light diesel and jet fuel distillate. In another aspect, a catalyst which comprises, in general, any crystalline zeolite cracking base upon which is deposited a Group VIII metal hydrogenating component may be suitable. Additional hydrogenating components may be selected from Group VIB for incorporation with the zeolite base.

The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and about 14 Angstroms. It is preferred to employ zeolites having a relatively high silica/alumina mole ratio between about 3 and about 12. Suitable zeolites found in nature include, for example, mordenite, stilbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8 and 12 Angstroms, wherein the silica/alumina mole ratio is about 4 to 6. One example of a zeolite falling in the preferred group is synthetic Y molecular sieve.

The natural occurring zeolites are normally found in a sodium form, an alkaline earth metal form, or mixed forms. The synthetic zeolites are nearly always prepared in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in U.S. Pat. No. 3,100,006.

Mixed polyvalent metal-hydrogen zeolites may be prepared by ion-exchanging with an ammonium salt, then partially back exchanging with a polyvalent metal salt and then calcining. In some cases, as in the case of synthetic mordenite, the hydrogen forms can be prepared by direct acid treatment of the alkali metal zeolites. In one aspect, the preferred cracking bases are those which are at least about 10 wt %, and preferably at least about 20 wt %, metal-cation-deficient, based on the initial ion-exchange capacity. In another aspect, a desirable and stable class of zeolites is one wherein at least about 20 wt % of the ion exchange capacity is satisfied by hydrogen ions.

The active metals employed in the preferred hydrocracking catalysts of the present invention as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between about 0.05 wt % and about 30 wt % may be used. In the case of the noble metals, it is normally preferred to use about 0.05 to about 2 wt % noble metal. Noble metals may be preferred as the hydrogenation metal on the hydrocracking catalyst to provide selectivity to jet fuel due to the absence of hydrogen sulfide and ammonia which can deactivate noble metal catalysts, but which have been removed upstream in the process.

The method for incorporating the hydrogenation metal is to contact the base material with an aqueous solution of a suitable compound of the desired metal wherein the metal is present in a cationic form. Following addition of the selected hydrogenation metal or metals, the resulting catalyst powder is then filtered, dried, pelleted with added lubricants, binders or the like if desired, and calcined in air at temperatures of, e.g., about 371° C. (700° F.) to about 648° C. (200° F.) in order to activate the catalyst and decompose ammonium ions. Alternatively, the base component may be pelleted, followed by the addition of the hydrogenation component and activation by calcining.

The foregoing catalysts may be employed in undiluted form, or the powdered catalyst may be mixed and copelleted with other relatively less active catalysts, diluents or binders such as alumina, silica gel, silica-alumina cogels, activated clays and the like in proportions ranging between about 5 and about 90 wt %. These diluents may be employed as such, or they may contain a minor proportion of an added hydrogenating metal such as a Group VIB and/or Group VIII metal. Additional metal promoted hydrocracking catalysts may also be utilized in the process of the present invention which comprises, for example, aluminophosphate molecular sieves, crystalline chromosilicates and other crystalline silicates. Crystalline chromosilicates are more fully described in U.S. Pat. No. 4,363,178.

By one approach, the hydrocracking conditions may include a temperature from about 290° C. (550° F.) to about 468° C. (875° F.), preferably 300° C. (572° F.) to about 445° C. (833° F.), a pressure from about 2.7 MPa (gauge) (400 psig) to about 20.7 MPa (gauge) (3000 psig), a liquid hourly space velocity (LHSV) from about 0.4 to less than about 2.5 hr$^{-1}$ and a hydrogen rate of about 421 Nm$^3$/m$^3$ (2,500 scf/bbl) to about 2,527 Nm$^3$/m$^3$ oil (15,000 scf/bbl).

The hydrocracked stream may exit the hydrocracking reactor 150 in a hydrocracked line 158. In an embodiment, the hydrocracked stream may feed directly to the hydroisomerization reactor 74. In this embodiment, the hydrocracked stream in the hydrocracked line 158 is recycled through a direct line 159 through a control valve thereon to a recycle line 98. The hydrocracked stream is mixed from the recycle line 98 with the hydroisomerization feed stream in the hydroisomerization feed line 90 to provide the combined hydroisomerization feed stream in combined hydroisomerization feed line 100, heated in heater 72 and fed to the hydroisomerization reactor 74.

In an alternative embodiment, the hydrocracked stream in the hydrocracked line 158 may be transported in a hydrocracking separator line 181 through a control valve thereon to a hydrocracking separator 180. The hydrocracked stream may then be separated in a hydrocracking separator 180. The hydrocracked stream may be separated in a hydrocracking separator 180 to provide a hydrocarbonaceous, vapor hydrocracked stream in a hydrocracking separator overhead line 182 and a hydrocarbonaceous, hydrocracked liquid stream in a hydrocracking separator bottoms line 184. The hydrocracking separator 180 may be in downstream communication with the hydrocracking reactor 150. The hydrocracking separator 180 operates at about 177° C. (350° F.) to about 371° C. (700° F.) and preferably operates at about 232° C. (450° F.) to about 315° C. (600° F.). The hydrocracking separator 180 may be operated at a slightly lower pressure than the hydrocracking reactor 150 accounting for pressure drop through intervening equipment. The hydrocracking separator 180 may be operated at pressures between about 3.4 MPa (gauge) (493 psig) and about 20.4 MPa (gauge) (2959 psig). The vapor hydrocracked stream in the hydrocracking separator overhead line 182 may have a temperature of the operating temperature of the hydrocracking separator 180. The vapor hydrocracked stream in the hydrocracking separator overhead line 182 may be combined with stripping gas in the isomerization overhead line 58 for stripping the process stream in line 54 taken from the hot separator bottoms stream.

The hydrocracked liquid stream in a hydrocracking separator bottoms line 184 may be processed in at least two manners. In a first embodiment, a control valve on line 186 is opened to enable combination at least some of the hydrocracked liquid stream from line 184 with the cold separator feed stream in line 84 to be cooled and separated in the cold separator 94 with the liquid hydroisomerized stream in the hydroisomerization bottoms line 82, the hot vapor stream in the hot overhead line 50, the hydrotreated vapor stream in the hydrotreated overhead line 60, and the cold aqueous stream in the cold aqueous line 87. The jet fuel and the light diesel components in the hydrocracked liquid stream will then be optionally stripped in the stripping column 120 and distilled in the distillation column 140 into the jet fuel stream in line 144, the light diesel stream in line 152 and the heavy diesel stream in line 148.

In a second embodiment, a control valve on a hydroisomerization tie line 188 is open to enable flow of at least some of the hydrocracked liquid stream form hydrocracked separator bottoms line 184 to the hydroisomerization reactor 74 to improve the cold flow properties of the jet fuel range hydrocarbons produced in the hydrocracking reactor 150. The liquid hydrocracked stream in the hydroisomerization tie line 188 is transported to the recycle line 98 and mixed with the hydroisomerization feed stream in hydroisomerized feed line 90 to produce the combined hydroisomerization feed stream in the combined hydroisomerization feed line 100, heated in the charge heater 72 and hydroisomerized in the hydroisomerization reactor 74 as previously described. The hydroisomerized, hydrocracked liquid is then processed with the rest of the hydroisomerized stream in line 76.

Figure 2:
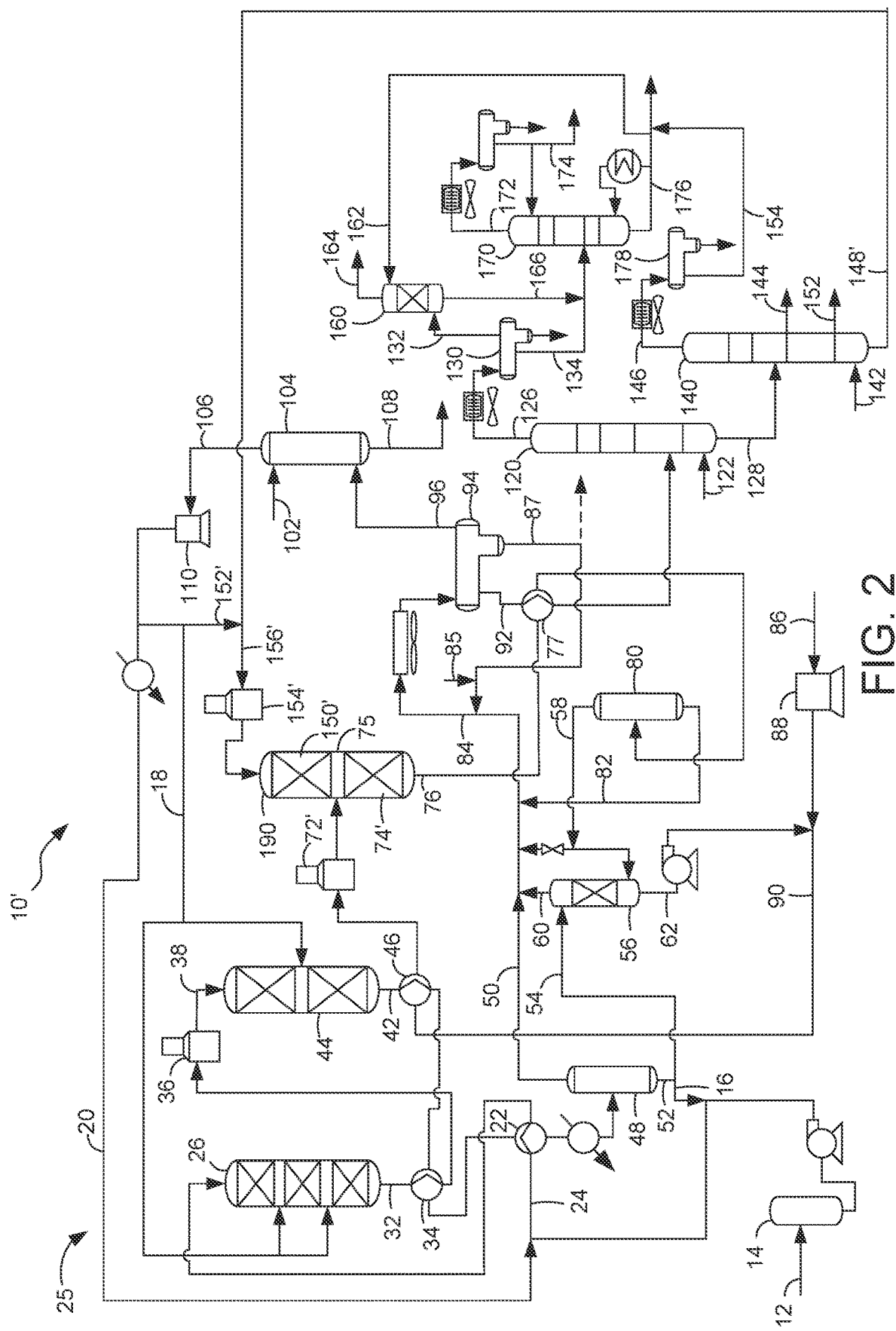
FIG. 2 is a simplified process flow diagram of an alternative embodiment of FIG. 1.

FIG. 2 shows an alternative embodiment which locates a bed of hydrocracking catalyst 150' and a bed of hydroisomerization catalyst 74' in a single reactor vessel 190 which may be more ideal for a revamp situation than the embodiment in FIG. 1. Elements in FIG. 2 with the same configuration as in FIG. 1 will have the same reference numeral as in FIG. 1. Elements in FIG. 2 which have a different configuration as the corresponding element in FIG. 1 will have the same reference numeral but designated with a prime symbol ('). The configuration and operation of the embodiment of FIG. 2 is essentially the same as in FIG. 1 with the following exceptions.

The heavy diesel stream in the distilled bottoms line 148' is mixed with a hydrocracking hydrogen stream in line 152', heated in a heater 154' and fed to a hydrocracking/hydroisomerization reactor vessel 190. The heated, heavy diesel stream is fed through a first reactor inlet into a hydrocracking catalyst bed 150'. Like in FIG. 1, the hydrocracking catalyst can be a noble metal catalyst because the hydrogen sulfide and ammonia which deactivate the hydrocracking catalyst are removed upstream of the hydrocracking catalyst bed 150'. All of the hydrocracked stream exiting from the hydrocracking catalyst bed 150' mixes with the isomerization feed stream in the isomerization feed line 90 in the interbed space 75 between the hydrocracking catalyst bed 150' and a hydroisomerization catalyst bed 74'. The mixture of the hydrocracked stream and the isomerization feed stream enters the hydroisomerization catalyst bed 74' located below the hydrocracking catalyst bed 150' from the interbed space 75. The hydrocracked stream and the isomerization feed stream are hydroisomerized in the presence of hydrogen over the hydroisomerization catalyst together. The hydroisomerization stream exits the hydroisomerization bed 74' in the hydroisomerized line 76 and is processed as described for FIG. 1.

The conditions in the hydrocracking/hydroisomerization reactor vessel 190 may include a temperature from about 290° C. (550° F.) to about 468° C. (875° F.), preferably 300° C. (572° F.) to about 445° C. (833° F.), a pressure from about 2.7 MPa (gauge) (400 psig) to about 20.7 MPa (gauge) (3000 psig), a liquid hourly space velocity (LHSV) from about 0.4 to less than about 2.5 hr$^{-1}$ and a hydrogen rate of about 421 Nm$^3$/m$^3$ (2,500 scf/bbl) to about 2,527 Nm$^3$/m$^3$ oil (15,000 scf/bbl).

Figure 3:
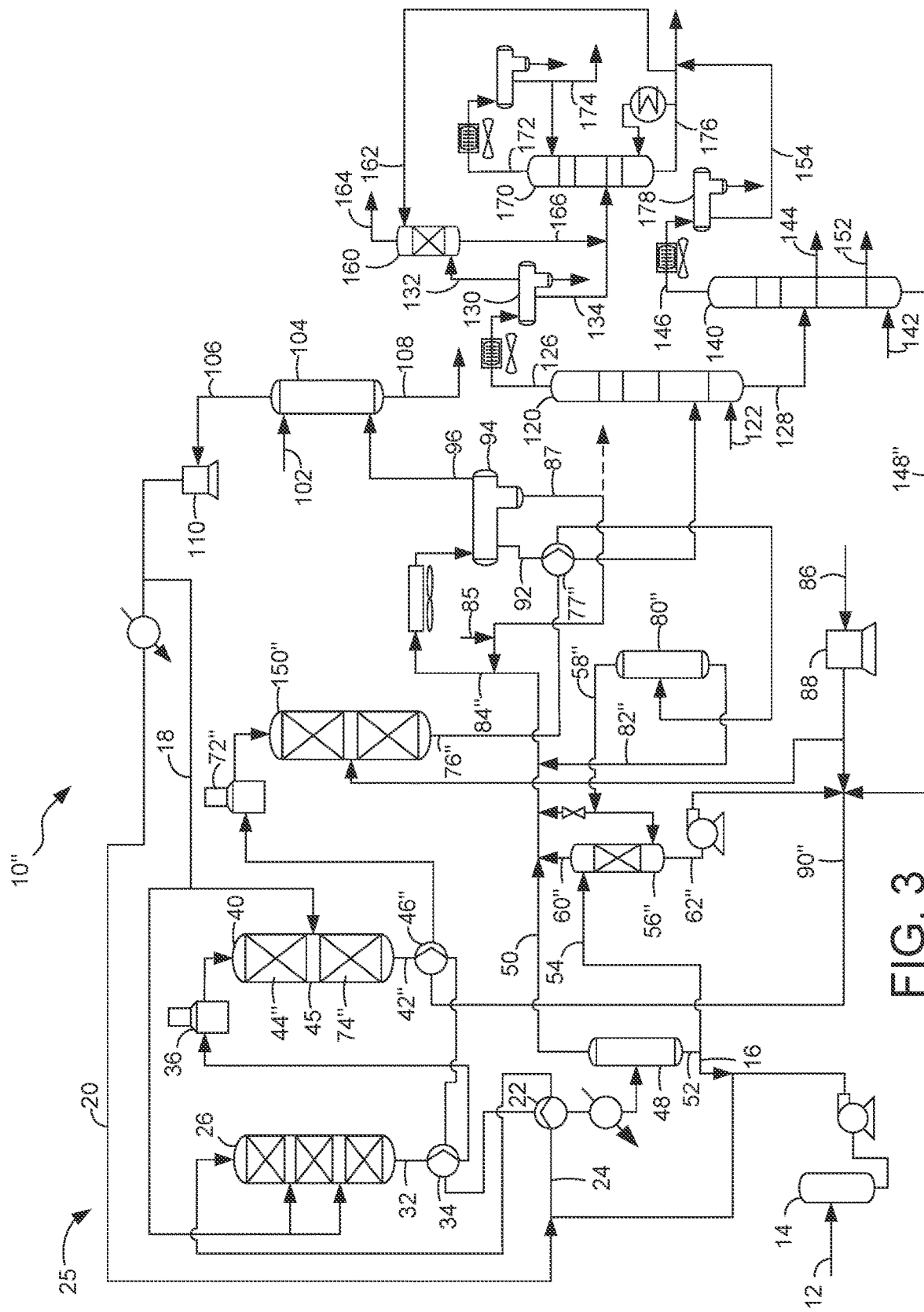
FIG. 3 is a simplified process flow diagram of a further alternative embodiment of FIG. 1 or 2.

FIG. 3 shows a further alternative embodiment which locates a bed of hydrotreating catalyst 44" and a bed of hydroisomerization catalyst 74" in a single reactor vessel 40. Hydroisomerization takes place in a sour environment in the presence of hydrogen sulfide, water and ammonia. A hydrocracking reactor 150" converts heavy diesel into jet fuel components. Elements in FIG. 3 with the same configuration as in FIG. 1 or 2 will have the same reference numeral as in FIG. 1 or 2, respectively. Elements in FIG. 3 which have a different configuration as the corresponding element in FIG. 1 or 2, respectively, will have the same reference numeral but designated with a double prime symbol ("). The configuration and operation of the embodiment of FIG. 3 is essentially the same as in FIG. 1 or 2, but with the following exceptions.

The contacted feed stream from the guard bed reactor 26 in the contacted feed line 32 is heated in the guard bed discharge heat exchanger 34 and heater 36 and fed into a hydrotreating/hydroisomerization reactor vessel 40 which may comprise at least two catalyst beds. The heated contacted feed stream is fed through a first reactor inlet into a hydrotreating catalyst bed 44". More than one catalyst bed 44" may be utilized. All of the hydrotreated stream exiting from the hydrotreating catalyst bed 44", the last hydrotreating catalyst bed 44" if multiple hydrotreating beds are utilized, mixes with a quench hydrogen stream in the interbed space 45 between the hydrotreating catalyst bed 44' and a hydroisomerization catalyst bed 74". The hydrotreated stream replenished and cooled with quench hydrogen enters the hydroisomerization catalyst bed 74" located below the hydrotreating catalyst bed 44" from the interbed space 45. The hydrotreated stream is hydroisomerized in the presence of hydrogen over the hydroisomerization catalyst in the hydroisomerization catalyst bed 74". More than one hydroisomerization catalyst bed 74" may be utilized.

The hydrotreating/hydroisomerization reaction temperature may range from between about 343° C. (650° F.) and about 427° C. (800° F.) and preferably between about 349° C. (690° F.) and about 400° C. (752° F.). Generally, hydrotreating/hydroisomerization conditions include a pressure of about 700 kPa (100 psig) to about 21 MPa (3000 psig).

A hydroisomerized stream is produced in a hydroisomerized line 42" from the hydroisomerization catalyst bed 74". The hydroisomerized stream in the hydroisomerized line 42" may first flow to the combined hydrocracking feed exchanger 46" to heat a hydrocracking feed stream in the hydrocracking feed line 90" and cool the hydroisomerized stream. As previously described, the cooled hydroisomerized stream in the hydroisomerized line 42" may then be heat exchanged with the contacted biorenewable feed stream in the guard bed discharge heat exchanger 34 to cool the hydroisomerized stream in the hydroisomerized line 42" and heat the contacted, biorenewable feed stream. The twice cooled hydroisomerized steam in the hydroisomerized line 42" may be then further cooled in the combined feed exchanger 22 by heat exchange with combined biorenewable feed stream in the combined feed line 24 to heat the combined biorenewable feed stream and cool the hydroisomerized stream in the hydroisomerized line 42". The thrice cooled hydroisomerized stream may be even further cooled, perhaps to make steam, before it is separated to provide a hydroisomerized vapor stream and a hydrotreated liquid stream.

The hydroisomerized stream may be separated in a hot separator 48 to provide a hydrocarbonaceous, hot vapor stream in a hot separator overhead line 50 and a hydrocarbonaceous, hot liquid stream in a hot separator bottoms line 52. The hot vapor stream in the hot separator overhead line 50 may have a temperature of the operating temperature of the hot separator 48.

The hot liquid stream in the hot separator bottoms line 52 may be split into two streams: a hot process liquid stream in a process line 54 taken from the hot liquid stream in the hot separator bottoms line 52 and the hot recycle liquid stream in the recycle line 16 also taken from the hot liquid stream in the hot separator bottoms line 52. The hot recycle liquid stream in the recycle line 16 may be combined with the biorenewable feed stream in line 12 as previously described.

The hot process liquid stream taken from the hot liquid stream in the process line 54 may be further separated in a hydroisomerizing separator 56" which may comprise an EHS with the aid of a stripping gas fed from a hydrocracked vapor line 58". The hot process liquid stream is separated to provide a hydroisomerized vapor stream and a hydroisomerized liquid stream. The hydroisomerizing separator 56" may be a high-pressure stripping column. In the hydroisomerizing separator 56", the hot process liquid stream from process line 54 flows down through the column where it is partially stripped of hydrogen, carbon dioxide, carbon monoxide, water vapor, propane, hydrogen sulfide, and phosphine, which are potential isomerization catalyst poisons, by contact with stripping gas from the hydrocracked vapor line 58". The stripping gas may comprise makeup hydrogen gas which has passed through the hydrocracking reactor 150" and a hydrocracking separator 80" as hereinafter described.

The stripping gas in the hydrocracking vapor line 58" enters the hydroisomerizing separator 56" below the inlet for the hot process liquid stream in the process liquid line 54. The hydroisomerizing separator 56" may include internals such as trays or packing located between the inlet for the hot process liquid stream in the process liquid line 54 and the inlet for the stripping gas in the hydrocracked vapor line 58" to facilitate stripping of the hot process liquid stream in the process line 54. The stripped gases and stripping gas exit in a hydroisomerized vapor stream in a hydroisomerized overhead line 60" extending from a top of the hydroisomerizing separator 56" and mix with the hot vapor stream in the hot overhead line 50 and an hydrocracked liquid stream in an hydrocracked bottoms line 82" and optionally a cold aqueous stream in a cold aqueous line 87 from a cold separator boot to provide a cold separator feed stream in a cold feed line 84".

The hydroisomerized liquid stream which may have been stripped collects in the bottom of the hydroisomerization separator 56" and flows in a hydroisomerized bottoms line 62" to the suction side of a bottoms pump. The hydroisomerized liquid stream comprises predominantly diesel range material.

The hydroisomerized liquid stream may be hydrocracked over a hydrocracking catalyst in the presence of a hydrocracking hydrogen stream. Make-up hydrogen gas in make-up line 86 may be compressed in a make-up gas compressor 88 and mixed with the hydroisomerized liquid stream pumped from the hydroisomerized bottoms line 62" and a distillation bottoms stream in a distillation bottoms line 148" to provide a combined hydrocracking feed stream in a hydrocracking feed line 90". The distillation bottoms stream comprises heavy diesel that can be too heavy to make jet fuel specification. Hence, by hydrocracking the heavy diesel in the distillation bottoms stream, greater yield of light diesel and jet fuel can be produced.

The combined hydrocracking feed stream in the hydrocracking feed line 90" may be heated in a combined hydrocracking feed exchanger 46" by heat exchange with the hydroisomerized stream in the hydroisomerized line 42" and heated in a hydrocracking charge heater 72" to bring the combined hydrocracking feed stream to hydrocracking temperature before charging the hydrocracking reactor 150". Hydrocracking in the hydrocracking reactor 150" is as described in FIG. 1.

A hydrocracked stream in a hydrocracked line 76" from the hydrocracking reactor 150" is reduced in boiling point relative to the hydrocracking feed steam. The hydrocracked stream in the hydrocracked line 76" from the hydrocracking reactor 150" flows to a hydrocracking exchanger 77" to be heat exchanged with a cold liquid stream in cold bottoms line 92 to cool it before entering the hydrocracking separator 80" for separation into a liquid hydrocracked stream and vapor hydrocracked stream. The vapor hydrocracked stream in a hydrocracked overhead line 58" extending from an overhead of hydrocracking separator 80" flows to the hydroisomerization separator 56" and may serve as the stripping gas in the hydroisomerization separator 56". A portion of the vapor hydrocracked stream may optionally bypass the hydroisomerization separator 56" and enter a cold feed line 84 through a control valve.

The rest of the arrangement and operation of the embodiment of FIG. 3 is as described in FIGS. 1 and 2.

Figure 4:
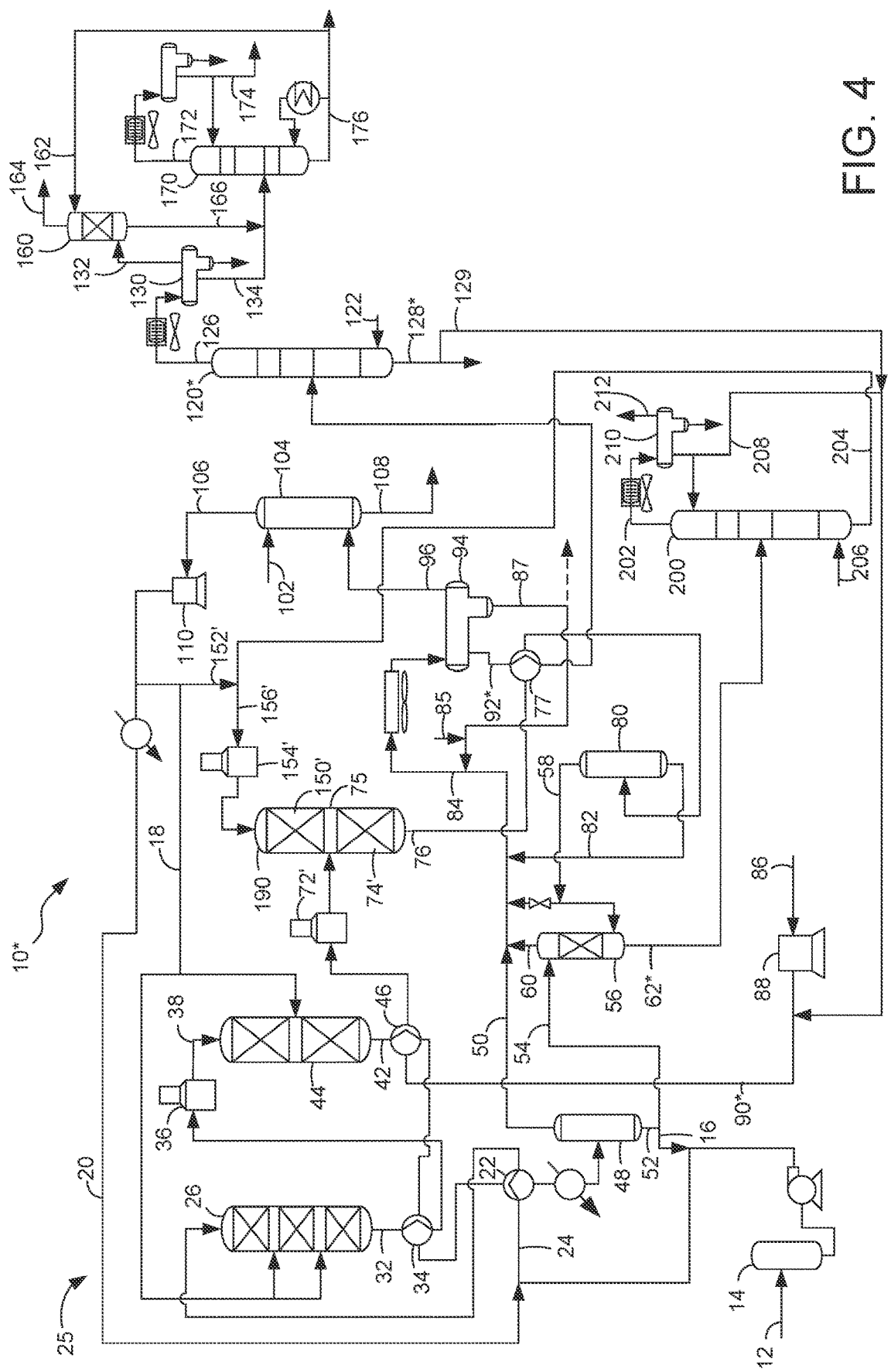
FIG. 4 is a simplified process flow diagram of a further alternative embodiment of FIG. 2.

FIG. 4 shows an alternative embodiment of FIG. 2 which locates a bed of hydrocracking catalyst 150' and a bed of hydroisomerization catalyst 74' in a single reactor vessel 190 but relies on a deoctadecanizer column 200 to make a split between light and heavy diesel. Elements in FIG. 4 with the same configuration as in FIG. 2 will have the same reference numeral as in FIG. 2. Elements in FIG. 4 which have a different configuration as the corresponding element in FIG. 2 will have the same reference numeral but designated with an asterisk symbol (*). The configuration and operation of the embodiment of FIG. 4 is essentially the same as in FIG. 2 with the following exceptions.

The hydrotreated liquid stream in a hydrotreated bottoms line 62* which may have been stripped collects in the bottom of the hydrotreating separator 56 and flows to the deoctadecanizer column 200 which distills the hydrotreated bottoms stream to produce an overhead stream comprising light diesel of $C_{17}-$ hydrocarbons and light gases in an overhead line 202 and a bottoms stream comprising heavy diesel of $C_{18}+$ hydrocarbons in a bottoms line 204. The deoctadecanizer column 200 may be reboiled by heat exchange with a suitable hot stream or in a fired heater to provide the necessary heat for the distillation. Alternately, a stripping media which is an inert gas such as steam from a stripping media line 206 may be used to heat the column. The deoctadecanizer column 200 provides an overhead gaseous stream of naphtha and normal hydrocarbons ranging $C_{10}$ to $C_{17}$ and steam in the overhead line 202. The overhead stream may be condensed and separated from water in a deoctadecanizer receiver 210 to provide normal $C_{10}$ to $C_{17}$ hydrocarbons in the overhead liquid stream in line 208. An unstabilized naphtha stream may be taken in the net vapor stream in an overhead line 212 of the receiver 210. A sour water stream may be collected from a boot of the deoctadecanizer receiver 210. The deoctadecanizer overhead liquid stream may be combined with the make-up hydrogen gas stream in line 86 to provide the isomerization feed stream in the isomerization feed line 90* which is routed to the hydroisomerization catalyst bed 74' in the reactor vessel 190. The deoctadecanizer bottoms stream comprising heavy diesel of $C_{18}+$ hydrocarbons is transported in the bottoms line 204 and routed to the hydrocracking catalyst bed 150' in reactor vessel 190.

The deoctadecanizer column 200 may be operated with a bottoms temperature between about 260° C. (500° F.) and about 316° C. (600° F.) and an overhead pressure of about 0.35 MPa (gauge) (50 psig), preferably no less than about 0.70 MPa (gauge) (100 psig), to no more than about 2.0 MPa (gauge) (290 psig).

The cold separator bottoms stream in line 92* may be transported to a jet stripper column 120* to produce light gases in the net stripper overhead stream in a net stripper overhead line 132 and naphtha in the overhead liquid stream 134. The stripped stream in line 128* is jet product that meets ASTM D7566 jet fuel specification and can be taken to the jet fuel pool. In an embodiment, a recycle line 129 may recycle some of the jet product stream to the hydroisomerization catalyst bed 74' for further hydroisomerization via line 208. The remainder of FIG. 4 is arranged and operated as described for FIGS. 1 and 2.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

Example

We performed the disclosed process in a pilot plant in which a hydrotreated stream proceeded through isomerization and was stripped in a single pass. We fed the stripped liquid isomerized stream to a distillation column which produced a light jet overhead stream and a heavy diesel bottom stream. The normal C18 concentrations of the stripped liquid hydroisomerized feed stream, light jet overhead stream, the heavy diesel stream and the enrichment factor are shown in the Table. The enrichment factor relates to the increase in concentration of normal C18 paraffins in the diesel stream relative to the hydroisomerized stream. The enrichment factor is two or more in all but one case. Moving the normal C18 paraffins into the diesel stream from the jet stream is important because the jet cut cannot have substantial amounts of normal C18 paraffins and still be able to make freeze point specifications while removing the low freeze point isomerized components from the heavy diesel to avoid unnecessarily cracking them further when this stream is further processed in a hydrocracking reactor.

provide a hydroisomerized stream; separating the hydrotreated stream and/or the hydroisomerized stream into a hydroprocessed vapor stream and a hydroprocessed liquid stream; distilling the hydroprocessed liquid stream or the hydroisomerized stream, optionally after stripping, to produce a jet fuel stream and a diesel stream; and hydrocracking the diesel stream to provide a hydrocracked stream comprising jet fuel. An embodiment of the disclosure is one, any or all of prior embodiments in this paragraph up through the first embodiment in this paragraph further comprising distilling the hydroisomerized stream and the hydrocracked stream. An embodiment of the disclosure is one, any or all of prior embodiments in this paragraph up through the first embodiment in this paragraph further comprising distilling the hydroisomerized stream. An embodiment of the disclosure is one, any or all of prior embodiments in this paragraph up through the first embodiment in this paragraph further comprising hydroisomerizing the hydrocracked stream. An embodiment of the disclosure is one, any or all of prior embodiments in this paragraph up through the first embodiment in this paragraph further comprising hydroisomerizing the hydrocracked stream. An embodiment of the disclosure is one, any or all of prior embodiments in this paragraph up through the first embodiment in this paragraph further comprising distilling the hydrocracked stream. An embodiment of the disclosure is one, any or all of prior embodiments in this paragraph up through the first embodiment in this paragraph further comprising hydroisomerizing the hydrotreated steam in the presence of hydrogen over the hydroisomerization catalyst to provide the hydroisomerized stream. An embodiment of the disclosure is one, any or all of prior embodiments in this paragraph up through the first embodiment in this paragraph further comprising separating the hydroisomerized stream in the separation step. An embodiment of the disclosure is one, any or all of prior embodiments in this paragraph up through the first embodiment in this paragraph further comprising distilling the hydrocracked stream with the hydroprocessed liquid stream. An embodiment of the disclosure is one, any or all of prior

TABLE

| nC18Concentrations, wt-% | | | | | | | | | |
|---|---|---|---|---|---|---|---|---|---|
| Hydroisomerized Feed Stream | 0.89 | 0.74 | 0.74 | 0.75 | 0.73 | 0.95 | 1.03 | 0.88 | 0.95 |
| Light Jet Stream | 0.01 | 0.01 | 0.01 | 0.01 | 0.01 | 0.01 | 0.01 | 0.01 | 0.02 |
| Heavy Diesel Stream | 1.93 | 1.73 | 1.75 | 1.70 | 1.73 | 1.93 | 2.00 | 1.94 | 2.17 |
| Enrichment Factor | 2.17 | 2.34 | 2.35 | 2.25 | 2.36 | 2.03 | 1.94 | 2.20 | 2.30 |
| Recovered Mass from Distillation, kg | | | | | | | | | |
| Heavy Diesel | 1.04 | 1.01 | 0.97 | 1.01 | 0.97 | 1.14 | 1.20 | 1.03 | 1.00 |
| Light Jet | 1.23 | 1.37 | 1.32 | 1.28 | 1.32 | 1.18 | 1.15 | 1.26 | 1.32 |

SPECIFIC EMBODIMENTS

While the following is described in conjunction with specific embodiments, it will be understood that this description is intended to illustrate and not limit the scope of the preceding description and the appended claims.

A first embodiment of the disclosure is a process for hydroprocessing a biorenewable feedstock, the process comprising hydrotreating the biorenewable feed stream in the presence of hydrogen over a hydrotreating catalyst to hydrodeoxygenate the biorenewable feed stream to provide a hydrotreated stream; hydroisomerizing a hydroisomerization feed stream taken from the hydrotreated stream in the presence of hydrogen over a hydroisomerization catalyst to embodiments in this paragraph up through the first embodiment in this paragraph wherein the diesel stream is a heavy diesel stream and further comprising producing a light diesel stream in the distillation step. An embodiment of the disclosure is one, any or all of prior embodiments in this paragraph up through the first embodiment in this paragraph further comprising separating the hydrotreated stream in the separation step; distilling the hydroprocessed liquid stream; hydroisomerizing the jet fuel stream and hydrocracking the diesel stream. An embodiment of the disclosure is one, any or all of prior embodiments in this paragraph up through the first embodiment in this paragraph further comprising hydroisomerizing the hydrocracked stream with the jet fuel stream. An embodiment of the disclosure is one, any or all of prior embodiments in this paragraph up through the first embodiment in this paragraph further comprising separating the hydroisomerized stream into a hydroisomerized liquid stream and a hydroisomerized vapor stream. An embodiment of the disclosure is one, any or all of prior embodiments in this paragraph up through the first embodiment in this paragraph further comprising stripping the hydroisomerized liquid stream into a naphtha stream and a jet fuel product stream. An embodiment of the disclosure is one, any or all of prior embodiments in this paragraph up through the first embodiment in this paragraph further comprising enriching the concentration of normal paraffins of a given carbon number by a factor of at least two in the diesel stream relative to the hydroisomerized stream.

A second embodiment of the disclosure is a process for hydroprocessing a biorenewable feedstock, the process comprising hydrotreating the biorenewable feed stream in the presence of hydrogen over a hydrotreating catalyst to hydrodeoxygenate the biorenewable feed stream to provide a hydrotreated stream; hydroisomerizing a hydroisomerization feed stream taken from the hydrotreated stream in the presence of hydrogen over a hydroisomerization catalyst to provide a hydroisomerized stream; enriching the concentration of normal paraffins of a given carbon number by a factor of at least two in a diesel stream taken from the hydroisomerized stream relative to the hydroisomerized stream; and hydrocracking or hydroisomerizing the diesel stream to provide a hydrocracked stream comprising jet fuel. An embodiment of the disclosure is one, any or all of prior embodiments in this paragraph up through the second embodiment in this paragraph wherein the enriching step is achieved by distillation of a hydroisomerized liquid stream. An embodiment of the disclosure is one, any or all of prior embodiments in this paragraph up through the second embodiment in this paragraph further comprising hydrocracking the diesel stream and hydroisomerizing the hydrocracked stream.

A third embodiment of the disclosure is a process for hydroprocessing a biorenewable feedstock, the process comprising hydrotreating the biorenewable feed stream in the presence of hydrogen over a hydrotreating catalyst to hydrodeoxygenate the biorenewable feed stream to provide a hydrotreated stream; hydroisomerizing the hydrotreated stream in the presence of hydrogen over a hydroisomerization catalyst to provide a hydroisomerized stream; separating the hydroisomerized stream into a hydroprocessed vapor stream and a hydroprocessed liquid stream; distilling the hydroprocessed liquid stream or the hydroisomerized stream, optionally after stripping, to produce a jet fuel stream and a diesel stream; and hydrocracking the diesel stream to provide a hydrocracked stream comprising jet fuel. An embodiment of the disclosure is one, any or all of prior embodiments in this paragraph up through the third embodiment in this paragraph further comprising hydroisomerizing the hydrocracked stream. Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for hydroprocessing a biorenewable feedstock, the process comprising:
   hydrotreating said biorenewable feed stream in the presence of hydrogen over a hydrotreating catalyst to hydrodeoxygenate said biorenewable feed stream to provide a hydrotreated stream;
   hydroisomerizing a hydroisomerization feed stream in a hydroisomerization reactor taken from said hydrotreated stream in the presence of hydrogen over a hydroisomerization catalyst to provide a hydroisomerized stream;
   separating said hydrotreated stream and/or said hydroisomerized stream into a hydroprocessed vapor stream and a hydroprocessed liquid stream;
   distilling said hydroprocessed liquid stream or said hydroisomerized stream, optionally after stripping, to produce a jet fuel stream and a diesel stream; and
   hydrocracking said diesel stream in a hydrocracking reactor to provide a hydrocracked stream comprising jet fuel.

2. The process of claim 1 further comprising distilling said hydroisomerized stream and said hydrocracked stream.

3. The process of claim 1 further comprising distilling said hydroisomerized stream.

4. The process of claim 3 further comprising hydroisomerizing said hydrocracked stream.

5. The process of claim 1 further comprising hydroisomerizing said hydrocracked stream.

6. The process of claim 1 further comprising distilling said hydrocracked stream.

7. The process of claim 5 further comprising hydroisomerizing said hydrotreated steam in the presence of hydrogen over said hydroisomerization catalyst to provide said hydroisomerized stream.

8. The process of claim 6 further comprising separating said hydroisomerized stream in said separation step.

9. The process of claim 5 further comprising distilling said hydrocracked stream with said hydroprocessed liquid stream.

10. The process of claim 1 wherein said diesel stream is a heavy diesel stream and further comprising producing a light diesel stream in said distillation step.

11. The process of claim 1 further comprising separating said hydrotreated stream in said separation step; distilling said hydroprocessed liquid stream; hydroisomerizing said jet fuel stream and hydrocracking said diesel stream.

12. The process of claim 10 further comprising hydroisomerizing said hydrocracked stream with said jet fuel stream.

13. The process of claim 11 further comprising separating said hydroisomerized stream into a hydroisomerized liquid stream and a hydroisomerized vapor stream.

14. The process of claim 12 further comprising stripping said hydroisomerized liquid stream into a naphtha stream and a jet fuel product stream.

15. The process of claim 1 further comprising enriching the concentration of normal paraffins of a given carbon number by a factor of at least two in the diesel stream relative to the hydroisomerized stream.

16. A process for hydroprocessing a biorenewable feedstock, the process comprising:
   hydrotreating said biorenewable feed stream in the presence of hydrogen over a hydrotreating catalyst to hydrodeoxygenate said biorenewable feed stream to provide a hydrotreated stream;

hydroisomerizing in a hydroisomerization reactor a hydroisomerization feed stream taken from said hydrotreated stream in the presence of hydrogen over a hydroisomerization catalyst to provide a hydroisomerized stream;

enriching the concentration of normal paraffins of a given carbon number by a factor of at least two in a diesel stream taken from said hydroisomerized stream relative to said hydroisomerized stream; and hydrocracking or hydroisomerizing said diesel stream in a hydrocracking reactor to provide a hydrocracked stream comprising jet fuel.

17. The process of claim 16 wherein said enriching step is achieved by distillation of a hydroisomerized liquid stream.

18. The process of claim 16 further comprising hydrocracking said diesel stream and hydroisomerizing said hydrocracked stream.

19. A process for hydroprocessing a biorenewable feedstock, the process comprising:

hydrotreating said biorenewable feed stream in the presence of hydrogen over a hydrotreating catalyst to hydrodeoxygenate said biorenewable feed stream to provide a hydrotreated stream;

hydroisomerizing said hydrotreated stream in a hydroisomerization reactor in the presence of hydrogen over a hydroisomerization catalyst to provide a hydroisomerized stream;

separating said hydroisomerized stream into a hydroprocessed vapor stream and a hydroprocessed liquid stream;

distilling said hydroprocessed liquid stream or said hydroisomerized stream, optionally after stripping, to produce a jet fuel stream and a diesel stream; and hydrocracking said diesel stream in a hydrocracking reactor to provide a hydrocracked stream comprising jet fuel.

20. The process of claim 19 further comprising hydroisomerizing said hydrocracked stream.

* * * * *